Patented July 29, 1952

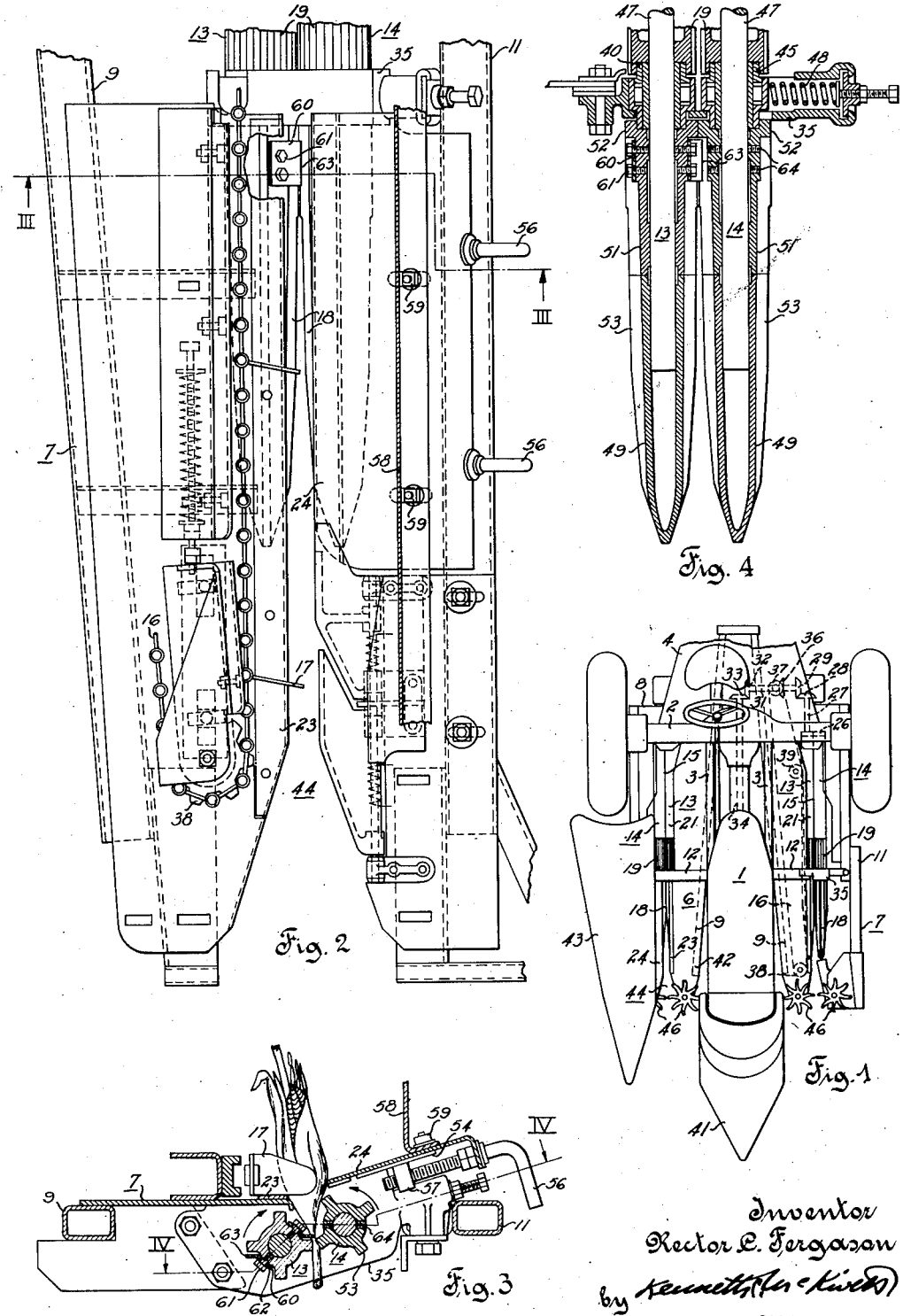

2,604,749

UNITED STATES PATENT OFFICE 2,604,749

EAR SEVERING DEVICE FOR CORN HARVESTERS

Rector C. Fergason, La Porte, Ind., assignor to Allis-Chalmers Manufacturing Company, Milwaukee, Wis., a corporation of Delaware Original application June 15, 1942, Serial No. 447,025. Divided and this application August 12, 1948, Serial No. 43,794

12 Claims. (Cl. 56—103)

This invention relates generally to harvesting apparatus and is more especially concerned with and contemplates improvements in the design and construction of harvesting rolls and associated parts such as find particular utility in removing ears of corn from stalks as the harvesting apparatus travels a crop row; the application and utility of the features hereinafter disclosed and claimed being also shown and described in my copending application Serial No. 111,057 filed August 18, 1949 as a continuation of application Serial No. 447,025 filed June 15, 1942 (now abandoned) and of which latter application the present application is a division.

Most harvesting apparatus of this type includes a pair of cooperative rolls operatively supported on a frame structure which is adapted to be attached to or connected with a tractor or other vehicle and thereby propelled in harvesting relation to crop rows, these rolls being mounted for rotation about generally parallel axes extending forward and downward in the direction of travel and usually comprising forward picking or snapping sections spaced apart, at least at their forward ends, to receive the stalks therebetween. One or both rolls may be power driven and their direction of rotation coupled with their direction of travel in effect results in the stalks passing downwardly therebetween and the ears being snapped from the stalks as the shank portions of the ears engage the rolls.

In general, the ear picking or snapping action of the prior known roll constructions is fairly satisfactory under ideal harvesting conditions, but when the corn is wet or green or conditions are otherwise such that the ears are not readily snapped from the stalks upon the shank portions of the ears engaging the rolls, the kernels adjacent the butts of the ears may be drawn into and pinched or otherwise damaged by the rolls. Moreover, if the stalks are not firmly rooted in the ground or are fairly brittle, they may be uprooted or broken off adjacent the rolls and carried into the picked-ear conveying and/or husking mechanism thereby rendering such mechanism ineffective and subject to plugging which is detrimental to efficient operation in that it may necessitate making frequent stops in order to clear the machine and/or in that the kernels of green ears, for example sweet corn for canning purposes, may be bruised or otherwise rendered worthless by a plugged or partially plugged picked-ear conveying mechanism.

In any event, it is highly desirable and an object of this invention to provide a corn harvester with an ear picking or snapping mechanism incorporating parts constructed and combined for coaction in an improved manner operative to positively and efficiently remove ears of corn from stalks without damaging the former.

Another object of the present invention is to provide a corn harvester with an ear picking or snapping mechanism incorporating improved features of design and construction serving to shear or cut the shank portion or stems of any ears which are not snapped off as the ear bearing portions of stalks approach the severing apparatus.

Additional objects and advantages will become apparent as the disclosure progresses and particularly sets forth the construction and operation of an illustrative apparatus embodying the invention. And accordingly the present invention may be considered as comprising the various constructions and/or combinations hereinafter more fully set forth in the detailed description and appended claims, reference being had to the accompanying drawing, in which:

Fig. 1 is a partial plan view of a tractor-harvester combination embodying the invention;

Fig. 2 is an enlarged plan view of the forward portion of the left-hand picking unit shown in Fig. 1;

Fig. 3 is a partial view taken on line III—III of Fig. 2; and

Fig. 4 is a partial view taken on line IV—IV of Fig. 3.

Referring to Fig. 1 of the drawing, it will be seen that the illustrated embodiment of the invention includes a conventional tricycle type tractor 1 having a rear axle structure 2 and a pair of forwardly extending side frame members 3, and includes a two-row corn harvester having a picked ear receiving portion 4 disposed in underslung relation to rear axle structure 2 and similar picking and husking units 6 and 7 extending forwardly in the direction of travel along opposite sides of the tractor. As indicated, the harvester includes a frame structure which is suitably mounted on the tractor, preferably detachably, and in general comprises a transverse rear portion 8 and forwardly extending side portions each including a pair of members 9 and 11 fixedly united and braced as by means of one or more transverse members 12.

Each picking and husking unit comprises a pair of cooperative side opposed rolls 13 and 14 forming the bottom of a trough-like structure 15 through which travels the active course of an endless conveyer 16 having laterally extending flights 17. Rolls 13 and 14 each include axially aligned snapping, trash removing, and husking sections 18, 19 and 21, respectively, the forward or snapping sections of each pair of rolls underlying a pair of spaced opposed stripper plates 23 and 24. The rear ends of each pair of rolls are rotatably supported in suitable bearings (not shown) and have intermeshing gears 26 affording simultaneous relation in opposite directions (note Fig. 3). The inner roll of each pair includes a rearward shaft extension 27 mounting a pinion 28 in mesh with a driving gear 29 on the adjacent end of a transverse shaft 31 which also mounts a gear 32 in driven relation to a gear 33 on the tractor power takeoff shaft 34. Rolls 13 and 14 are additionally rotatably supported in a housing 35 enclosing a pair of side opposed bearing structures 40 and 45 (note Fig. 4) operatively mounting shaft portions of the rolls intermediate the snapping and trash sections thereof. Endless conveyers 16 are also driven from transverse shaft 31 through an underlying vertical shaft carrying a gear at its upper end in mesh with a gear 36 on shaft 31 and carrying a sprocket 37 at its lower end drivingly receiving the rear portion of the conveyer. The forward end of the conveyer passes around a sprocket 38 and its active course is caused to operatively travel trough 15 by means of one or more suitably positioned guides 39, the flights 17 passing over inner stripper plate 23, over inner bearing structure 40, over the husking section 19 of roll 13, and thence on through the rear portion of trough 15 thereby delivering picked ears rearwardly to receiving portion 4.

The forward end of the tractor is preferably provided with a suitable shield 41 and each picking unit is also provided with laterally spaced shields 42 and 43 coacting to in part form the forward portion of trough 15 and a stalk receiving throat 44. Shields 41 and 43 operate as gathering devices to lift and direct down-stalks into the throat 44 and this gathering action may be aided by the provision of a pair of rotatably mounted spider elements 46 disposed in underlying relation to the forward portion of shields 42 and 43. In operation, as the harvester is propelled along adjacent rows, the base portions of the stalks enter the throats formed by the forward portions of shields 42 and 43, stripper plates 23 and 24, and the roll snapping sections 18. And as the harvester continues to move forward, this movement coupled with the rotation and inclination of the rolls (it is to be understood that the rolls are inclined downward and approach the ground at their forward ends as is the usual practice) in effect results in the stalks passing downward between the rolls, the rear portions of the snapping sections operating to remove the ears from the stalks passing therebetween. In general, the relative rearward movement of the stalks is limited by their engagement with bearing housing 35 and any loose leaves or other trash carried beyond this point by the active portion of conveyer 16 are seized by and carried through the trash roll sections 19.

As previously indicated, it is highly desirable to remove the ears from the stalks without damaging the former, and referring more particularly to Figs. 2-4, inclusive, it will be seen that each roll comprises a shaft portion 47, that the bearings 40 and 45 supporting the forward portions of shafts 47 are biased toward each other by means of a compression spring 48 adjustably mounted in a portion of bearing housing 35, that the snapping sections of the rolls each includes a hollow tapered point element 49 and a generally cylindrical rear element 51, the latter presenting a plain cylindrical enlarged rear portion 52, and that the movement of the bearings and rolls toward each other, as effected by spring 48, is limited by engagement of the opposed plain cylindrical portions 52 of the snapping sections. The point and rear elements forming each snapping section are preferably provided with longitudinally extending aligned ribs 53 and each pair of these elements are preferably removably secured to its shaft 47 in any suitable manner, as by transverse holes and pins (not shown). As best seen in Fig. 4, the ribs 53 diverge forwardly to form the previously mentioned stalk receiving space or throat therebetween and in this connection it should be apparent that these ribs are arranged in opposed relation, that only the rear portions thereof are in close proximity, and that these rear portions move apart compressing spring 48 as stalks pass therebetween.

Referring to Fig. 3, it will be noted that the axes of the rolls 13 and 14 are disposed in vertically stepped relation and in generally underlying relation to stripper plates 23 and 24, respectively, that stripper plate 24 is adjustably mounted on a support 54 for selective movement toward or away from plate 23. As shown, a rod 56 threadably engages a depending lug 57 on the bottom of the stripper plate which extends through a slot (not shown) in support 54, this rod being carried in axially fixed, rotatable relation by a stationary part 58 of the harvester. Plate 24 is retained in any selected position by tightening the nuts 59 which clamp plate 24 between parts 54 and 58 and all that has to be done in order to adjust the position of this stripper plate is to loosen these nuts and turn rod 56 in the proper direction. Preferably plate 24 is positioned relative to plate 23 so as to leave a gap therebetween through which the stalks freely pass, but which is sufficiently narrow to engage the butts of ears and prevent their coming into contact with the rolls. And in this connection it should also be noted that plate 24 is positioned in somewhat tilted elevated relation with respect to plate 23 and acts (note Fig. 3) to push the ears as they are severed from stalks passing therebetween over onto plate 23 and into the path of conveyer flights 17.

Rolls 13 and 14 are rotated in opposite directions so that the top portions of these rolls move downward toward the most proximate side opposed portions thereof, as indicated by the arrows on Fig. 3. And in order to insure a positive severing of the ears from the stalks, the rear portion of one or both snapping sections 18 are provided with one or more detachable snapping clips 60 extending radially outward slightly beyond the periphery of ribs 53. The clips or blades are attached in longitudinally adjustable position on the rolls through cap screws 61 passing through elongated apertures 62 in the base portions of the blades. The active or cutting edge 63 of the blade or clip is preferably positioned slightly rearwardly of the leading edge of the rib 53 on the roll at a point where the clip will just clear or pass by the adjacent rib on the opposite roll without interference during rotation of the rolls, these blades or clips serving to shear or cut any ear stems that are not snapped off.

As previously indicated, the stalks pass downward between the stripper plates and rolls until the butts of the ears engage the stripper plates as shown in Fig. 3. And if the ears are not snapped from the stalks by such engagement, their downward movement is arrested and the ear stem or shank portion is severed by the cutting or shearing action of the blade or clip, the ear falling over onto plate 23 where it is engaged by the flights of conveyer 16 and carried rearward to the harvested ear receiving portion 4. In most cases, it has been found effective to apply two or more blades or clips to only one of the rolls, preferably the lowermost roll, in which case the opposite or uppermost roll serves as a guide member in the sense that it coacts to force the stem or shank portions of the ears into cutting relation to the knife portion on the opposite roll. However, it will be noted (see Fig. 3) that the other roll is also provided with internally threaded holes 64 thus affording means for similarly attaching cutting blades or clips thereto. In any event, it should be apparent that since the rolls move apart as the stalks pass therebetween, the opposed ribs are separated by the thickness of the stalk compressed therebetween and the cutting edge of the coacting blade moves downward toward the opposed rib on the opposite roll and into severing relation with respect to the stem or shank portion of an ear on such stalk.

In severing the ears from stalks through the action of cutting blades or the like, it is desirable to provide a conveying means operative to carry the severed ears away from the rolls without coming into contact with the cutting edges thereon. And in the disclosed arrangement such conveying action is afforded by the severed ears falling onto the upper surface of stripper plate 23 which in a sense functions as a guard since it prevents severed ears from contacting the rotating blades, the severed ears being carried along the upper surface of this plate by the flights 17 of endless conveyer 16. Moreover, a better severing action is obtained by providing means operative to arrest downward movement of the ear shank or stem portion relative to the downward movement of the cutting edge and in the disclosed arrangement, this advantage is afforded by the coaction of stripper plates 23 and 24. In addition, it is also desirable that the cutting edges employed in severing the stem or shank portions of ears from stalks be effective throughout the active snapping portions of rolls, that is throughout those portions of opposed rolls or the like actually cooperating to effect the positive ear severing action previously indicated as afforded by the rear portions of the rolls herein shown and described.

Therefore, while the invention is disclosed as applied to a two-row corn harvester equipped with coacting stripper plates positioned in overlying relation to each pair of cooperative harvesting rolls, it is basically applicable to all types of ear picking corn harvesters since the overall and relative length of the cutting edges and opposed roll surface may be varied considerably without materially affecting the above mentioned positive ear severing action. Consequently, it is not intended to limit the invention to the exact constructions, combinations and/or relative dimensions herein disclosed for purposes of illustration as various modifications within the scope of the appended claims may occur to persons skilled in the art.

It is claimed and desired to secure by Letters Patent:

1. A corn harvesting machine for severing ears of corn from stalks in the field comprising: a mobile vehicle frame; a stalk engaging guide mounted on said frame and extending longitudinally thereof in the direction of its travel; and a longitudinally extending driven rotor journaled in the frame alongside of said guide so as to provide an open front passageway to admit standing corn between the guide and rotor, said rotor having a plurality of cutting blades, each of said blades having a forwardly extending cutting portion to travel downwardly towards said guide and cut into a corn stalk, said cutting portion extending farther from the axis of the rotor than the body of the blade to provide space between said body and guide into which the adjacent uncut portion of the stalk may be drawn, the guide being opposite from said cutting portion and spaced therefrom a distance less than the diameter of a stalk of corn whereby the guide and blade cooperate to feed the stalks downwardly and to sever ears of corn therefrom.

2. A corn harvesting machine as specified in claim 1 in which the stalk engaging guide is in the form of a roll which is journaled in the frame.

3. A machine as specified in claim 1, in which a guard is mounted on the vehicle frame above the rotor so as to prevent severed ears from falling onto the blades, and a driven conveyer is mounted on said frame to receive said severed ears.

4. A corn harvesting machine for cutting ears of corn from stalks in the field comprising: a mobile vehicle frame; a stalk engaging guide mounted on said frame and extending longitudinally thereof in the direction of its travel; and a driven rotor journaled in the frame in substantially parallel spaced relation to said guide so as to provide an open front passageway to admit standing corn between the guide and rotor, said rotor having a cutting blade provided with a cutting edge extending outwardly a substantial distance from the rotor sufficient to cut through a corn stalk and traveling downwardly towards said guide, the guide being at least substantially co-extensive with said cutting edge, and said rotor having a portion of its cutting edge spaced from said guide a distance less than the diameter of a stalk of corn whereby the guide and rotor cooperate to cut ears of corn from stalks passing therebetween.

5. A machine as specified in claim 4, in which a guard is mounted on the frame above the rotor so as to prevent severed ears from falling onto the blade, and a driven conveyer is mounted on said frame to receive said severed ears.

6. A machine as specified in claim 4, in which the rotor has a plurality of cutting blades, and each of the blades has its cutting edge extending outwardly and forwardly in the direction of rotation.

7. A corn harvesting machine for cutting ears of corn from stalks in the field comprising: a mobile vehicle frame; a stalk engaging member mounted on said frame and extending longitudinally thereof in the direction of its travel; and a driven rotor journaled in the frame in substantially parallel spaced relation to said member so as to provide an open front passageway to admit standing corn between the member and rotor, said rotor having a cutting blade provided with a cutting edge extending outwardly a substantial distance from the rotor sufficient to cut through a corn stalk and traveling downwardly towards said member, the member coactively opposing said cutting edge throughout substantially the entire length of the latter, and said rotor having a portion of its cutting edge spaced from said member a distance less than the diameter of a stalk of corn whereby the member and rotor cooperate to cut ears of corn from stalks passing therebetween.

8. A corn harvesting machine for severing ears of corn from stalks in the field comprising: a mobile vehicle frame, a pair of rolls mounted on said frame and extending longitudinally thereof in the direction of travel for receiving stalks therebetween, said rolls being disposed in proximate side-opposed relation with their longitudinal axes generally parallel, one of said rolls mounting a plurality of circumferentially spaced blade elements each having a forwardly extending cutting portion, and means for driving said one roll in a direction such that the cutting portions of said blade elements successively travel downward toward the side opposed surface of the other roll, said cutting portion extending farther from the axis of said one roll than the body of the blade element to provide space between said body and said other roll into which the adjacent uncut portion of the stalk may be drawn.

9. A corn harvesting machine for severing ears of corn from stalks in the field comprising: a mobile vehicle frame, a pair of rolls mounted on said frame and extending longitudinally thereof in the direction of travel for receiving stalks therebetween, said rolls being disposed in proximate side-opposed relation with their longitudinal axes generally parallel and disposed in vertically stepped relation, one of said rolls mounting a plurality of circumferentially spaced blade elements each having a forwardly extending cutting portion, and means for driving said rolls in opposite directions such that the cutting portions of said blade elements successively travel downward toward the side opposed surface of the other roll, the cutting portion of each blade element extending farther from the axis of said one roll than the body of the blade element to provide space between said body and said other roll into which the adjacent uncut portion of the stalk may be drawn by the relative relation of said rolls.

10. A corn harvesting machine for severing ears of corn from stalks in the field comprising: a mobile vehicle frame; a pair of rolls mounted on said frame and extending longitudinally thereof in the direction of travel for receiving stalks therebetween, said rolls being disposed in proximate side-opposed relation with their longitudinal axes generally parallel, stripper plates carried by said frame in spaced opposed relation to each other and in elevated relation to said rolls with the gap between said plates overlying the side-opposed surface portions of said rolls; one of said rolls mounting at least one blade element having a forwardly extending cutting portion; and means driving said one roll in a direction such that the cutting portion of said blade element travels downward toward the opposed surface of the other of said rolls, said cutting portion extending farther from the axis of said one roll than the body of the blade element to provide space between said body and said other roll into which the adjacent uncut portion of the stalk may be drawn.

11. A corn harvesting machine for severing ears of corn from stalks in the field comprising: a mobile vehicle frame; a pair of rolls mounted on said frame and extending longitudinally thereof in the direction of travel for receiving stalks therbetween, said rolls being disposed in proximate side-opposed relation with their longitudinal axes generally parallel and disposed in vertically stepped relation, stripper plates carried by said frame in spaced opposed relation to each other and in elevated relation to said rolls with the gap between said plates overlying the side-opposed surface portions of said rolls; the lower one of said rolls mounting at least one blade element having a forwardly extending cutting portion; and means driving said one roll in a direction such that the cutting portion of said blade element travels downward toward the opposed surface of the other of said rolls, said cutting portion extending farther from the axis of said one roll than the body of the blade element to provide space between said body and said other roll into which the adjacent uncut portion of the stalk may be drawn.

12. A corn harvesting machine for severing ears of corn from stalks in the field comprising: a mobile frame; a pair of rolls mounted on said frame and extending longitudinally thereof in the direction of travel for receiving stalks therebetween, said rolls being disposed in proximate side-opposed relation with their longitudinal axes generally parallel and disposed in vertically stepped relation; stripper plates carried by said frame in spaced opposed relation to each other and in elevated relation to said rolls with the gap between said plates overlying the side-opposed surface portions of said rolls, the lower one of said rolls mounting a plurality of circumferentially spaced blade elements each having a forwardly extending cutting portion, and means for driving said rolls in opposite directions such that the cutting portions of said blade elements successively travel downward toward the side opposed surface of the other roll, the cutting portion of each blade element extending farther from the axis of said one roll than the body of the blade element to provide space between said body and said other roll into which the adjacent uncut portion of the stalk may be drawn by the relative rotation of said rolls.

RECTOR C. FERGASON.

REFERENCES CITED

The following references are of record in the file of this patent:

UNITED STATES PATENTS

| Number | Name | Date |
|---|---|---|
| 461,246 | Meader | Oct. 13, 1891 |
| 702,720 | Gernand | June 17, 1902 |
| 876,189 | Ingersoll | Jan. 7, 1908 |
| 880,139 | Hahn | Feb. 25, 1908 |
| 923,806 | Boda | June 8, 1909 |
| 1,046,335 | Rust | Dec. 3, 1912 |
| 2,241,928 | Shedd et al. | May 13, 1941 |